United States Patent
Mukai et al.

(10) Patent No.: US 11,262,254 B2
(45) Date of Patent: Mar. 1, 2022

(54) FORCE SENSOR AND STRAIN ELEMENT

(71) Applicant: SINTOKOGIO, LTD., Nagoya (JP)

(72) Inventors: Suguru Mukai, Nagano (JP); Natsuki Yui, Nagano (JP); Hiroyasu Makino, Aichi (JP); Takumi Kobayashi, Aichi (JP)

(73) Assignee: SINTOKOGIO, LTD., Aichi (JP)

( * ) Notice: Subject to any disclaimer, the term of this patent is extended or adjusted under 35 U.S.C. 154(b) by 52 days.

(21) Appl. No.: 16/826,868

(22) Filed: Mar. 23, 2020

(65) Prior Publication Data

US 2020/0309618 A1 Oct. 1, 2020

(30) Foreign Application Priority Data

Mar. 29, 2019 (JP) .............................. JP2019-068598

(51) Int. Cl.
 *G01L 3/00* (2006.01)
 *G01L 1/22* (2006.01)

(52) U.S. Cl.
 CPC .............. *G01L 1/2262* (2013.01); *G01L 3/00* (2013.01)

(58) Field of Classification Search
 CPC ................................ G01L 1/2262; G01L 3/00
 See application file for complete search history.

(56) References Cited

U.S. PATENT DOCUMENTS

| | | | | |
|---|---|---|---|---|
| 3,985,025 A | * | 10/1976 | Ormond ................ | G01L 1/2231 177/255 |
| 5,063,788 A | * | 11/1991 | Ch'Hayder ........... | G01L 5/1627 73/862.043 |
| 2004/0045372 A1 | * | 3/2004 | Liu .......................... | G01L 1/22 73/862.041 |
| 2005/0081645 A1 | * | 4/2005 | Ohsato ................... | G01L 5/162 73/862.041 |
| 2008/0053247 A1 | * | 3/2008 | Sakurai ................... | G01L 1/205 73/862.041 |
| 2010/0199783 A1 | * | 8/2010 | Sakurai ................... | G01P 15/18 73/862.044 |
| 2013/0291653 A1 | * | 11/2013 | Kempainen ........... | G01L 5/1627 73/862.045 |
| 2019/0056279 A1 | * | 2/2019 | Li .......................... | G01L 1/2231 |
| 2020/0309617 A1 | * | 10/2020 | Mukai .................. | G01L 1/2262 |

FOREIGN PATENT DOCUMENTS

| | | |
|---|---|---|
| JP | 6047703 B2 | 12/2016 |
| JP | 6378381 B1 | 8/2018 |

* cited by examiner

*Primary Examiner* — Max H Noori
(74) *Attorney, Agent, or Firm* — Harness, Dickey & Pierce, P.L.C.

(57) ABSTRACT

The present invention achieves a force sensor in which an electrode, element, and/or the like connected to a strain gauge can be suitably attached to a strain element. The force sensor includes: a strain element including an arm portion that is deformable under an external force; and a strain gauge attached to the arm portion. The strain element includes a projection that sticks out from the arm portion in a direction intersecting the longitudinal direction of the arm portion.

5 Claims, 15 Drawing Sheets

FORCE SENSOR AND STRAIN ELEMENT

This Nonprovisional application claims priority under 35 U.S.C. § 119 on Patent Application No. 2019-068598 filed in Japan on Mar. 29, 2019, the entire contents of which are hereby incorporated by reference.

TECHNICAL FIELD

The present invention relates to a force sensor. In particular, the present invention relates to a force sensor that includes (i) a strain element having a deformable portion that is deformable under an external force and (ii) a strain gauge attached to the deformable portion.

BACKGROUND ART

There is a known force-torque sensor which includes (i) a strain element having deformable portions that are deformable under external forces and (ii) strain gauges attached to the deformable portions and which detects external forces using the strain gauges. For example, Patent Literatures 1 and 2 each disclose a six-axis force-torque sensor that is capable of detecting the following components of an external force individually: a component in a direction along an x axis; a component in a direction along a y axis; a component in a direction along a z axis; a moment component about the x axis; a moment component about the y axis; and a moment component about the z axis.

CITATION LIST

Patent Literature

[Patent Literature 1]
Japanese Patent No. 6047703
[Patent Literature 2]
Japanese Patent No. 6378381

SUMMARY OF INVENTION

Technical Problem

The strain element employed in the six-axis force-torque sensor disclosed in Patent Literatures 1 and 2 includes (i) a core portion (also called a central portion or a force receiver), (ii) a frame portion which extends around the core portion and which includes flexures (such a frame portion is also called a rim portion or a fixing portion), and (iii) arm portions that connect the core portion and the flexures. This six-axis force-torque sensor includes a plurality of strain gauges attached to the arm portions and the flexures which deform upon exertion of an external force on the core portion, and detects the six components of the external force using the strain gauges.

In such a force-torque sensor, it is necessary to form a bridge circuit by connecting such strain gauges together by conductive traces or wires or the like. However, the strain gauges are provided on long narrow structures such as arm portions and flexures. Therefore, electrodes for connection of the strain gauges with the conductive traces or wires are arranged densely, resulting in difficulty in wiring operations such as soldering traces or wires.

Furthermore, in such a force-torque sensor, a thin-film resistor is sometimes attached near a strain gauge to balance the resistance of a bridge circuit. However, if an element that changes its properties upon deformation, like a thin-film resistor, is attached to an arm portion or a flexure, the element changes its properties when an external force is exerted on the strain element, resulting in a loss of accuracy of the force-torque sensor.

The present invention was made in view of the above issues, and an object thereof is to achieve (i) a strain element to which an electrode, an element, and/or the like connected with a strain gauge can be suitably attached and (ii) a force sensor including such a strain element.

Solution to Problem

A force sensor in accordance with a first aspect of the present invention includes: a strain element including a deformable portion that is deformable under an external force; and a strain gauge attached to the deformable portion, and employs the following arrangement. Specifically, the strain element includes a projection that sticks out from the deformable portion in a direction intersecting a longitudinal direction of the deformable portion.

A strain element in accordance with another aspect of the present invention includes a deformable portion that is deformable under an external force, and employs the following arrangement similarly to the force sensor in accordance with the first aspect. Specifically, the strain element includes a projection that sticks out from the deformable portion in a direction intersecting a longitudinal direction of the deformable portion.

Advantageous Effects of Invention

According to the present invention, it is possible to achieve a force sensor in which an element connected with a strain gauge can be suitably attached to a strain element.

DESCRIPTION OF EMBODIMENTS

[Configuration of Force-Torque Sensor]

Figure 1:
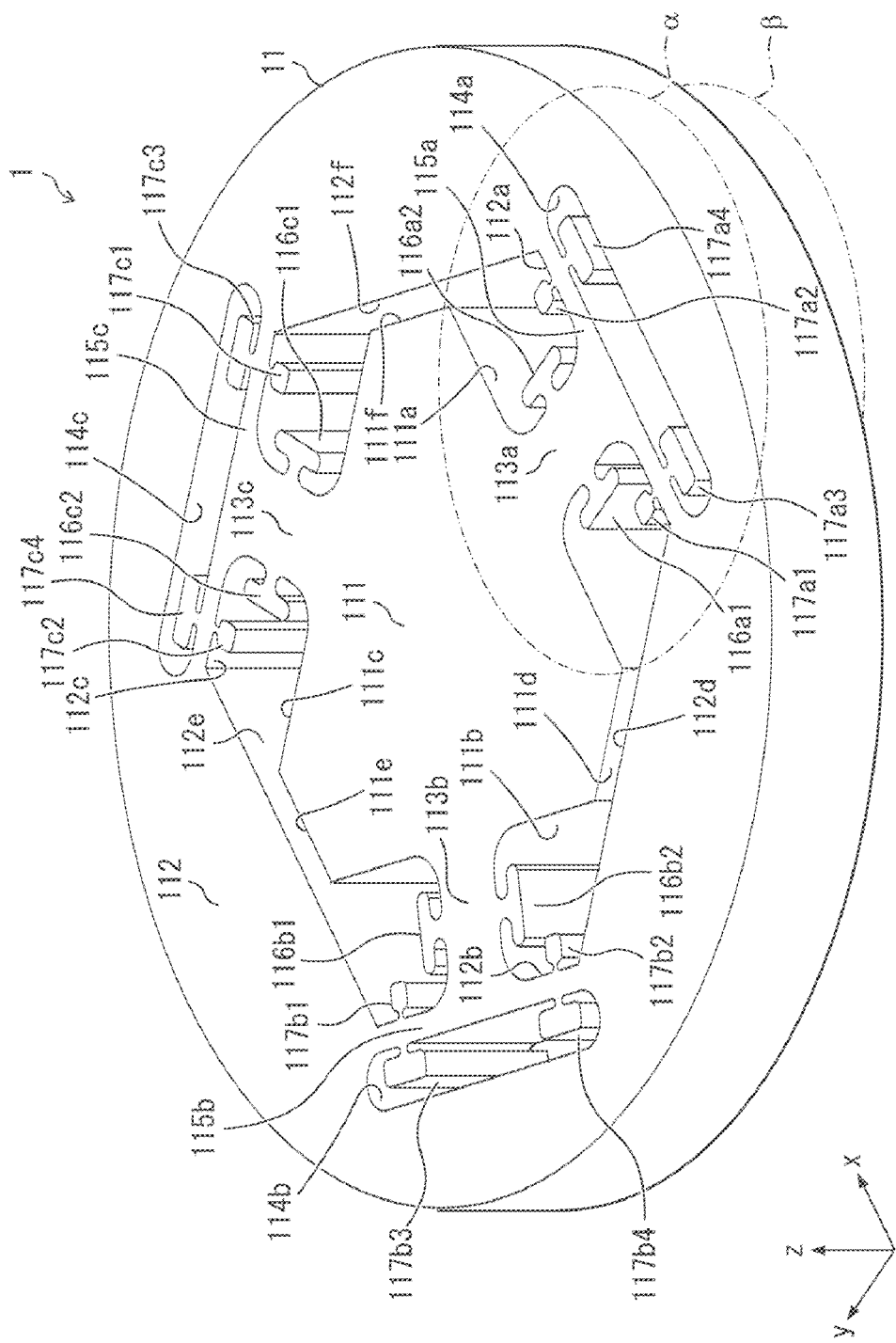
FIG. 1 is a perspective view illustrating a strain element of a force-torque sensor in accordance with an embodiment of the present invention.

The following description will discuss a configuration of a force-torque sensor 1 (an example of force sensor) in accordance with an embodiment of the present invention, with reference to FIGS. 1 to 5.

The force-torque sensor 1 is a six-axis force-torque sensor. The force-torque sensor 1 includes: a strain element 11; a strain gauge group 12 constituted by twenty-four strain gauges; an electrode group 13 constituted by forty-eight electrodes; a resistive element group 14 constituted by twenty-four resistive elements; and a bridge circuit group 15 constituted by six bridge circuits. As used herein, the term "six-axis force-torque sensor" refers to a force-torque sensor that is capable of detecting the following components of an external force: a component in a direction along an x axis; a component in a direction along a y axis; a component in a direction along a z axis; a moment component about the x axis; a moment component about the y axis; and a moment component about the z axis. Note that it is assumed here that the strain element 11 is disposed such that its first and second opposite main faces are parallel to the x-y plane. The first main face of the strain element 11, which is located downstream of the second main face in the positive z direction, is referred to as "front face". The second main face of the strain element 11, which is located downstream of the first main face in the negative z direction, is referred to as "back face".

FIG. 1 is a perspective view illustrating the strain element 11 of the force-torque sensor 1. The strain element is a structure made of a material with a spring property. As illustrated in FIG. 1, the strain element 11 includes: a core portion 111, a frame portion 112 that extends around the core portion 111; and arm portions 113*a* to 113*c* which connect the core portion 111 and the frame portion 112. A material for the strain element 11 is, for example, an aluminum alloy, alloy steel, stainless steel, and/or the like. A method of fabricating the strain element 11 is, for example, numerical controlled (NC) machining or the like. Note that, if an external force is exerted on the core portion 111 while the frame portion 112 is in a fixed state, the arm portions 113*a* to 113*c* undergo a strain that varies in accordance with that external force. Therefore, the core portion 111 may be referred to as "force receiver", and the frame portion 112 may be referred to as "fixing portion".

There is no particular limitation on the shape of the core portion 111. In the present embodiment, the core portion 111 is in the shape of a prism with a substantially hexagonal base (i.e., substantially in the shape of a hexagonal prism). There is no particular limitation on the shape of the frame portion 112, as well. In the present embodiment, the frame portion 112 is in the shape of a tube with a substantially circular base having a substantially hexagonal opening. The core portion 111 is located within a space defined by the frame portion 112 such that its six side faces 111a to 111f face respective six inwardly facing faces 112a to 112f of the frame portion 112.

There is no particular limitation on the shapes of the arm portions 113a to 113c. In the present embodiment, each of the arm portions 113a to 113c is in the shape of a prism with a substantially rectangular base (i.e., substantially in the shape of a quadratic prism). There is no particular limitation on the number of arm portions 113, as well. In the present embodiment, the number of arm portions 113 is three. The arm portion 113a extends from the core portion 111 in the negative y direction in the x-y plane, and connects the side face 111a of the core portion 111 and the inwardly facing face 112a of the frame portion 112. The arm portion 113b extends from the core portion 111 at an angle of −120° (120° clockwise) from the negative y direction in the x-y plane, and connects the side face 111b of the core portion 111 and the inwardly facing face 112b of the frame portion 112. The arm portion 113c extends from the core portion 111 at an angle of +120° (120° counterclockwise) from the negative y direction in the x-y plane, and connects the side face 111c of the core portion 111 and the inwardly facing face 112c of the frame portion 112.

The frame portion 112 has through-holes 114a to 114c passing through the frame portion 112 along the z axis. The through-hole 114a is located near the border between the arm portion 113a and the frame portion 112 such that the longitudinal direction of the through-hole 114a is orthogonal to the direction of extension of the arm portion 113a. The through-hole 114b is located near the border between the arm portion 113b and the frame portion 112 such that the longitudinal direction of the through-hole 114b is orthogonal to the direction of extension of the arm portion 113b. The through-hole 114c is located near the border between the arm portion 113c and the frame portion 112 such that the longitudinal direction of the through-hole 114c is orthogonal to the direction of extension of the arm portion 113c. Such an arrangement of through-holes allows the arm portions 113a to 113c to undergo a strain that varies in accordance with an external force.

Hereinafter, a portion of the frame portion 112 where it connects to the arm portion 113a (i.e., a portion of the frame portion 112 located radially inward from the through-hole 114a) is referred to as a flexure 115a. Also, a portion of the frame portion 112 where it connects to the arm portion 113b (i.e., a portion of the frame portion 112 located radially inward from the through-hole 114b) is referred to as a flexure 115b. A portion of the frame portion 112 where it connects to the arm portion 113c (i.e., a portion of the frame portion 112 located radially inward from the through-hole 114c) is referred to as a flexure 115c.

Figure 2:
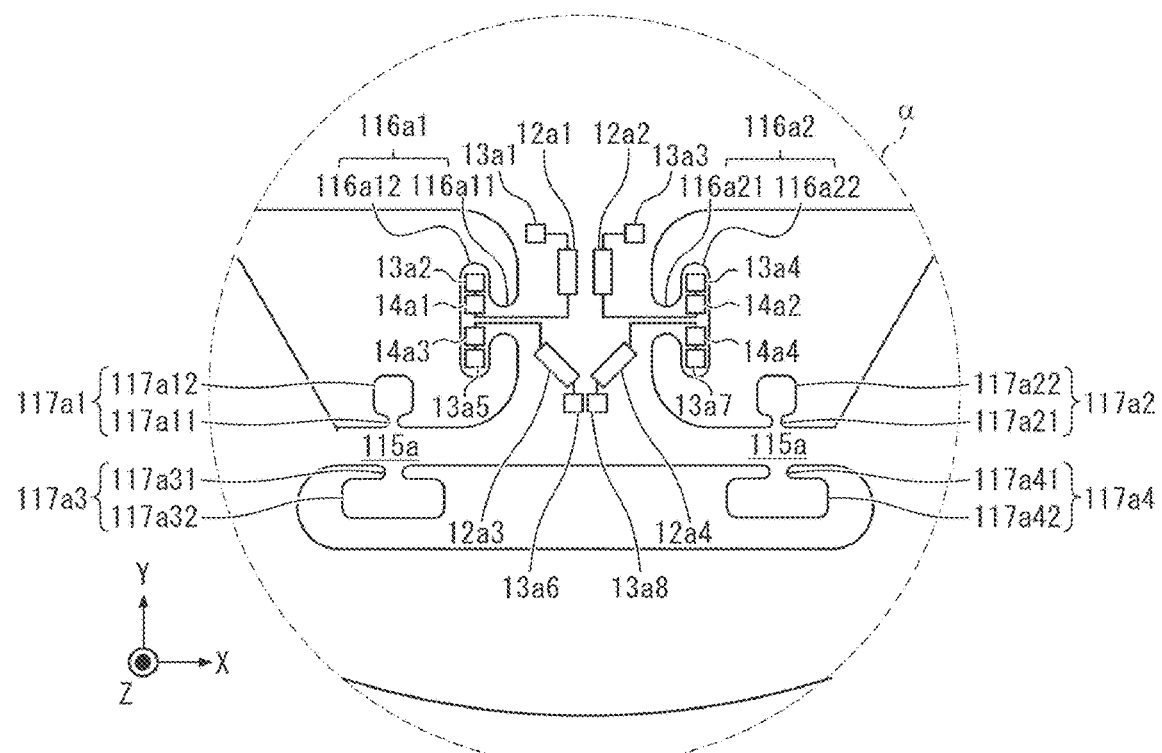
FIG. 2 is a plan view illustrating a part of a front face of the strain element of FIG. 1.

FIG. 2 is a plan view illustrating a part (area enclosed by circle α in FIG. 1) of the front face of the arm portion 113a. As illustrated in FIG. 2, four strain gauges 12a1 to 12a4 are attached on the front face of the arm portion 113a. Each of the strain gauges 12a1 to 12a4 can be, for example, (i) a thin conductor film (e.g., thin metal film such as Cu—Ni-based alloy thin film or Ni—Cr-based alloy thin film) covered with an insulator film (e.g., resin film such as a polyimide film or an epoxy film) or (ii) a thin semiconductor film covered with such an insulator film. The strain gauges 12a1 to 12a4 can be attached by, for example, bonding, vacuum evaporation, sputtering, or the like.

Of these four strain gauges 12a1 to 12a4, the two strain gauges 12a1 and 12a2, which are located in a radially inner portion of the front face (i.e., which are closer to the core portion 111 than the other two are), are each disposed such that the longitudinal direction thereof is parallel to the direction of extension of the arm portion 113a in the x-y plane. The other two strain gauges 12a3 and 12a4, which are located in a radially outer portion of the front face (i.e., which are closer to the frame portion 112 than the former two are), are each disposed such that the longitudinal direction thereof is at an angle of 45° to the direction of extension of the arm portion 113a in the x-y plane.

The strain gauge 12a1 has two electrodes 13a1 and 13a2 connected thereto. There is a resistive element 14a1 inserted in a trace or a wire between the strain gauge 12a1 and the electrode 13a2. Note that the phrase "there is a resistive element inserted in a trace or a wire between A and B" means that the trace or wire has a A-side part and a B-side part and that the resistive element has its one of opposite ends connected to the A-side part and the other of the opposite ends connected to the B-side part. The same applies to the following. The strain gauge 12a2 has two electrodes 13a3 and 13a4 connected thereto. There is a resistive element 14a2 inserted in a trace or a wire between the strain gauge 12a2 and the electrode 13a4. The strain gauge 12a3 has two electrodes 13a5 and 13a6 connected thereto. There is a resistive element 14a3 inserted in a trace or a wire between the strain gauge 12a3 and the electrode 13a5. The strain gauge 12a4 has two electrodes 13a7 and 13a8 connected thereto. There is a resistive element 14a4 inserted in a trace or a wire between the strain gauge 12a4 and the electrode 13a7. As such, the arm portion 113a has, on its front face, not only the four strain gauges 12a1 to 12a4 but also the eight electrodes 13a1 to 13a8 and the four resistive elements 14a1 to 14a4. Note that the electrodes 13a1 to 13a8, the resistive elements 14a1 to 14a4, and traces or wires connecting these electrodes and elements can be formed by, for example, sputtering.

Figure 3:
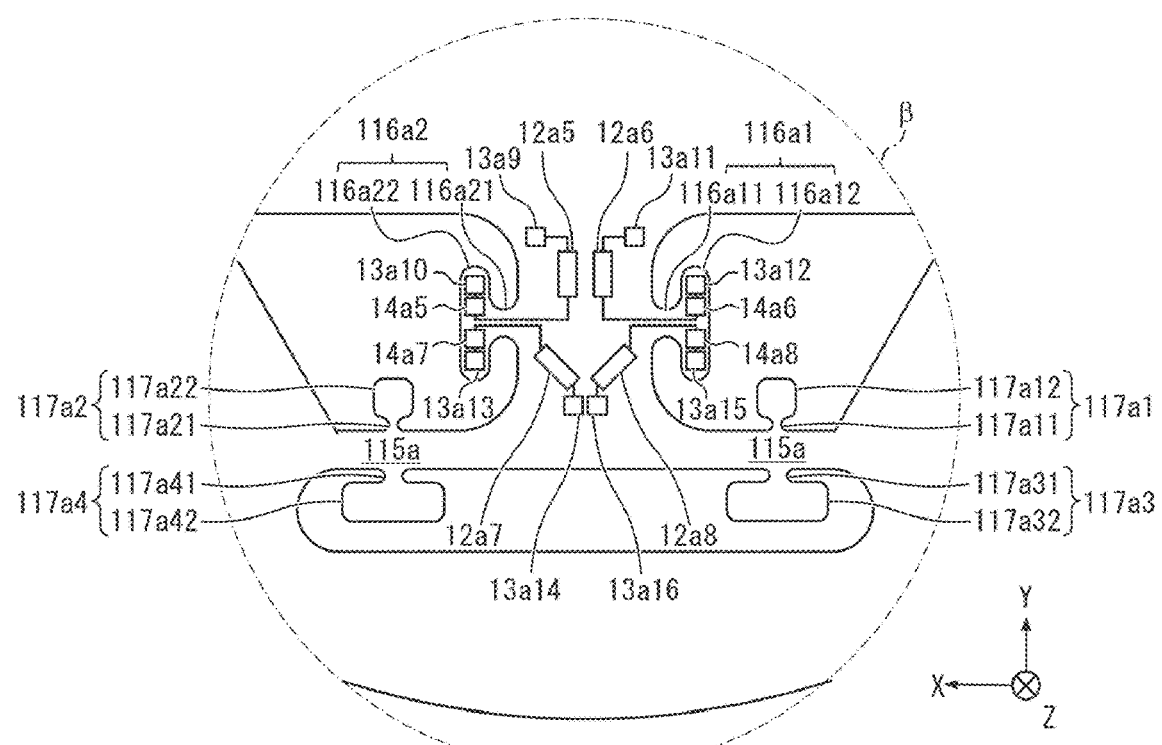
FIG. 3 is a plan view illustrating a part of a back face of the strain element of FIG. 1.

FIG. 3 is a plan view illustrating a part (area enclosed by circle β in FIG. 1) of the back face of the arm portion 113a. As illustrated in FIG. 3, the arm portion 113a has four strain gauges 12a5 to 12a8 attached on its back face. The strain gauges 12a5 to 12a8 can each be (i) a thin conductor film covered with an insulator film or (ii) a thin semiconductor film covered with an insulator film, as with the case of the strain gauges 12a1 to 12a4. The strain gauges 12a5 to 12a8 can be attached by, for example, bonding, vacuum evaporation, sputtering, or the like, as with the case of the strain gauges 12a1 to 12a4.

Of these four strain gauges 12a5 to 12a8, the two strain gauges 12a5 and 12a6, which are located in a radially inner portion of the back face, are each disposed such that the longitudinal direction thereof is parallel to the direction of extension of the arm portion 113a in the x-y plane. The strain gauges 12a5 and 12a6, and the two strain gauges 12a1 and 12a2 (which are located in the radially inner portion of the front face), are connected to form a bridge circuit. The other two strain gauges 12a7 and 12a8, which are located in a radially outer portion of the back face, are each disposed such that the longitudinal direction thereof is at an angle of 45° to the direction of extension of the arm portion 113a in the x-y plane. The strain gauges 12a7 and 12a8, and the two strain gauges 12a3 and 12a4 (which are located in the radially outer portion of the front face), are connected to form a bridge circuit.

The strain gauge 12a5 has two electrodes 13a9 and 13a10 connected thereto. There is a resistive element 14a5 inserted in a trace or a wire between the strain gauge 12a5 and the electrode 13a10. The strain gauge 12a6 has two electrodes 13a11 and 13a12 connected thereto. There is a resistive element 14a6 inserted in a trace or a wire between the strain gauge 12a6 and the electrode 13a12. The strain gauge 12a7 has two electrodes 13a13 and 13a14 connected thereto. There is a resistive element 14a7 inserted in a trace or a wire between the strain gauge 12a7 and the electrode 13a13. The strain gauge 12a8 has two electrodes 13a15 and 13a16 connected thereto. There is a resistive element 14a8 inserted in a trace or a wire between the strain gauge 12a8 and the electrode 13a15. As such, the arm portion 113a has, on its back face, not only the four strain gauges 12a5 to 12a8 but also the eight electrodes 13a9 to 13a16 and the four resistive elements 14a5 to 14a8. Note that the electrodes 13a9 to 13a16, the resistive elements 14a5 to 14a8, and traces or wires connecting these electrodes and elements can be attached by, for example, sputtering.

As has been described, the arm portion 113a has, on each of its front and back faces, four strain gauges, eight electrodes, and four resistive elements. Similarly to the arm portion 113a, the arm portion 113b also has, on each of its front and back faces, four strain gauges, eight electrodes, and four resistive elements. Similarly to the arm portion 113a, the arm portion 113c also has, on each of its front and back faces, four strain gauges, eight electrodes, and four resistive elements. That is, the strain element 11 has twenty-four strain gauges in total, forty-eight electrodes in total, and twenty-four resistive elements in total. The foregoing strain gauge group 12 refers to a set of these twenty-four strain gauges, the foregoing electrode group 13 refers to a set of these forty-eight electrodes, and the foregoing resistive element group 14 refers to a set of these twenty-four resistive elements.

Figure 4:
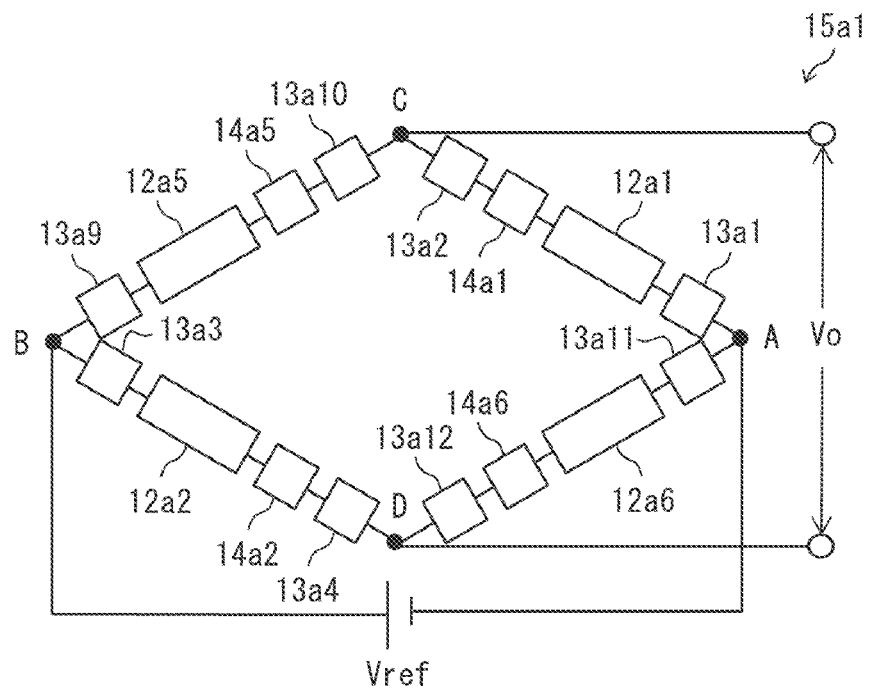
FIG. 4 is a circuit diagram of a bridge circuit that includes (i) strain gauges provided in a radially inner portion of the front face of an arm portion of the strain element of FIG. 1 and (ii) strain gauges provided in a radially inner portion of the back face of the arm portion.

FIG. 4 is a circuit diagram of a bridge circuit 15a1 that includes (i) the two strain gauges 12a1 and 12a2 provided in the radially inner portion of the front face of the arm portion 113a and (ii) the two strain gauges 12a5 and 12a6 provided in the radially inner portion of the back face of the arm portion 113a. The bridge circuit 15a1 is realized by connecting electrodes by conductive traces or wires or the like in the following manner.

Connect the electrode 13a1 connected to the strain gauge 12a1 and the electrode 13a11 connected to the strain gauge 12a6

Connect the electrode 13a3 connected to the strain gauge 12a2 and the electrode 13a9 connected to the strain gauge 12a5

Connect the electrode 13a2 connected to the strain gauge 12a1 and the electrode 13a10 connected to the strain gauge 12a5

Connect the electrode 13a4 connected to the strain gauge 12a2 and the electrode 13a12 connected to the strain gauge 12a6

As shown in FIG. 4, a voltage Vo between nodes C and D obtained when a reference voltage Vref is applied between nodes A and B is an output voltage of the bridge circuit 15a1. As used herein, node A refers to the midpoint between the electrode 13a1 connected to the strain gauge 12a1 and the electrode 13a11 connected to the strain gauge 12a6. Node B refers to the midpoint between the electrode 13a3 connected to the strain gauge 12a2 and the electrode 13a9 connected to the strain gauge 12a5. Node C refers to the midpoint between the electrode 13a2 connected to the strain gauge 12a1 and the electrode 13a10 connected to the strain gauge 12a5. Node D refers to the midpoint between the electrode 13a4 connected to the strain gauge 12a2 and the electrode 13a12 connected to the strain gauge 12a6. The resistive elements 14a1, 14a2, 14a5, and 14a6 included in the bridge circuit 15a1 serve to balance the resistance of the bridge circuit 15a1.

Figure 5:
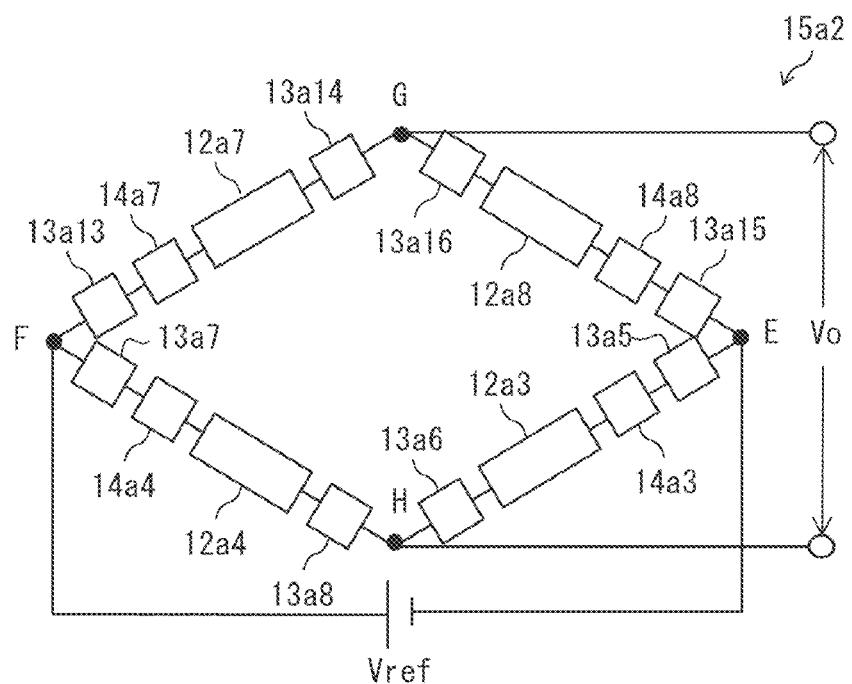
FIG. 5 is a circuit diagram of a bridge circuit that includes (i) strain gauges provided in a radially outer portion of the front face of the arm portion of the strain element of FIG. 1 and (ii) strain gauges provided in a radially outer portion of the back face of the arm portion.

FIG. 5 is a circuit diagram of a bridge circuit 15a2 that includes (i) the two strain gauges 12a3 and 12a4 provided in the radially outer portion of the front face of the arm portion 113a and (ii) the two strain gauges 12a7 and 12a8 provided in the radially outer portion of the back face of the arm portion 113a. The bridge circuit 15a2 is realized by connecting electrodes by conductive traces or wires or the like in the following manner.

Connect the electrode 13a5 connected to the strain gauge 12a3 and the electrode 13a15 connected to the strain gauge 12a8

Connect the electrode 13a7 connected to the strain gauge 12a4 and the electrode 13a13 connected to the strain gauge 12a7

Connect the electrode 13a14 connected to the strain gauge 12a7 and the electrode 13a16 connected to the strain gauge 12a8

Connect the electrode 13a6 connected to the strain gauge 12a3 and the electrode 13a8 connected to the strain gauge 12a4

As shown in FIG. 5, a voltage Vo between nodes G and H obtained when a reference voltage Vref is applied between nodes E and F is an output voltage of the bridge circuit 15a2. As used herein, node E refers to the midpoint between the electrode 13a5 connected to the strain gauge 12a3 and the electrode 13a15 connected to the strain gauge 12a8. Node F refers to the midpoint between the electrode 13a7 connected to the strain gauge 12a4 and the electrode 13a13 connected to the strain gauge 12a7. Node G refers to the midpoint between the electrode 13a14 connected to the strain gauge 12a7 and the electrode 13a16 connected to the strain gauge 12a8. Node H refers to the midpoint between the electrode 13a6 connected to the strain gauge 12a3 and the electrode 13a8 connected to the strain gauge 12a4. The resistive elements 14a3, 14a4, 14a7, and 14a8 included in the bridge circuit 15a2 serve to balance the resistance of the bridge circuit 15a2.

As has been described, the arm portion 113a has two bridge circuits each comprised of four strain gauges, eight electrodes, and four resistive elements provided on the arm portion 113a. The arm portion 113b also has two bridge circuits each comprised of four strain gauges, eight electrodes, and four resistive elements provided on the arm portion 113b, similarly to the four strain gauges, the eight electrodes, and the four resistive elements provided on the arm portion 113a. The arm portion 113c also has two bridge circuits each comprised of four strain gauges, eight electrodes, and four resistive elements provided on the arm portion 113c, similarly to the four strain gauges, the eight electrodes, and the four resistive elements provided on the arm portion 113a. That is, the strain element 11 has six bridge circuits in total. The foregoing bridge circuit group 15 refers to a set of these six bridge circuits. Note that, if resistance balancing in the bridge circuits constituting the bridge circuit group 15 is not necessary, the resistive element group 14 is not essential.

[Characteristics of Force-Torque Sensor]

The following description discusses characteristics of the force-torque sensor 1 with further reference to FIGS. 1 to 3.

The force-torque sensor 1 is characterized in that the strain element 11 has projections. Each projection sticks out from a deformable portion (i.e., a portion where deformation occurs when an external force is exerted on the core portion 111 of the strain element 11) in a direction intersecting the longitudinal direction of the deformable portion in the x-y plane. Such a projection is adjacent to the deformable portion; therefore, the projection can be suitably used as an area for attachment of at least one or all of the elements (such as an electrode and/or a resistive element) which are connected to another element (such as a strain gauge) attached on the deformable portion. Such a projection is less prone to deformation than the deformable portion, despite that it is adjacent to the deformable portion. Therefore, the projection can be especially suitably used as an area for attachment of an element that changes its properties upon deformation (such an element is, for example, a resistive element) and that is connected to another element (such as a strain gauge) attached on the deformable portion.

In the force-torque sensor 1 in accordance with the present embodiment, the arm portions 113a to 113c and the flexures 115a to 115c correspond to the above-described deformable portions. That is, the strain element of the force-torque sensor 1 in accordance with the present embodiment includes: projections 116a1 to 116c2 sticking out from the arm portions 113a to 113c; and projections 117a1 to 117c4 sticking out from the flexures 115a to 115c (see FIG. 1).

The following description discusses the projections 116a1 and 116a2 sticking out from the arm portion 113a, with reference to FIGS. 2 and 3.

The projection 116a1 sticks out from the middle portion of the arm portion 113a in the negative x direction. The direction in which the projection 116a1 sticks out (i.e., the negative x direction) intersects (orthogonally in the example shown in FIGS. 2 and 3) the longitudinal direction of the arm portion 113a (i.e., direction along the y axis). The projection 116a2 sticks out from the middle portion of the arm portion 113a in the positive x direction. The direction in which the projection 116a2 sticks out (i.e., the positive x direction) intersects (orthogonally in the example shown in FIGS. 2 and 3) the longitudinal direction of the arm portion 113a (i.e., direction along the y axis). The projections 116a1 and 116a2 have neck portions 116a11 and 116a21, respectively, and head portions 116a12 and 116a22, respectively. One of the opposite ends of each of the neck portions 116a11 and 116a21 is connected to the arm portion 113a. The other of the opposite ends of the neck portion 116a11 is connected to the head portion 116a12, and the other of the opposite ends of the neck portion 116a21 is connected to the head portion 116a22. The width (i.e., a dimension along the longitudinal direction of the arm portion 113a) of each of the neck portions 116a11 and 116a21 is smaller than the width (i.e., a dimension along the longitudinal direction of the arm portion 113a) of each of the head portions 116a12 and 116a22. This arrangement makes the projections 116a1 and 116a2 (especially, head portions 116a12 and 116a22) even less likely to deform even when the arm portion 113a deforms.

As illustrated in FIG. 2, the projection 116a1 has, on its front face, the electrode 13a2 and the resistive element 14a1 which are connected to the strain gauge 12a1, and the electrode 13a5 and the resistive element 14a3 which are connected to the strain gauge 12a3. As illustrated in FIG. 3, the projection 116a1 has, on its back face, the electrode 13a12 and the resistive element 14a6 which are connected to the strain gauge 12a6, and the electrode 13a15 and the resistive element 14a8 which are connected to the strain gauge 12a8. As illustrated in FIG. 2, the projection 116a2 has, on its front face, the electrode 13a4 and the resistive element 14a2 which are connected to the strain gauge 12a2, and the electrode 13a7 and the resistive element 14a4 which are connected to the strain gauge 12a4. As illustrated in FIG. 3, the projection 116a2 has, on its back face, the electrode 13a10 and the resistive element 14a5 connected to the strain gauge 12a5, and the electrode 13a13 and the resistive element 14a7 which are connected to the strain gauge 12a7.

As such, according to the force-torque sensor 1 in accordance with the present embodiment, one or more of the electrodes 13a1 to 13a16 can be attached on the projections 116a1 and 116a2. This reduces the density of the electrodes 13a1 to 13a16, and thus provides the effect of making it easy to wire the electrodes 13a1 to 13a16 (e.g., easy to solder traces or wires connecting the electrodes). Furthermore, according to the force-torque sensor 1 in accordance with the present embodiment, the resistive elements 14a1 to 14a8 can be attached on the projections 116a1 and 116a2. This prevents or reduces changes in resistance of the resistive elements 14a1 to 14a8 that would be caused by the deformation of the arm portion 113a, and thus provides the effect of preventing or reducing a loss of accuracy of the force-torque sensor 1 that would be caused by the changes in resistance of the resistive elements 14a1 to 14a8.

Note that the width (i.e., a dimension along the longitudinal direction of the arm portion 113a) of each of the neck portions 116a11 and 116a21 of the respective projections 116a1 and 116a2 is preferably not more than half a length L of the arm portion 113a.

The following description discusses the projections 117a1 to 117a4 sticking out from the flexure 115a, with reference to FIGS. 2 and 3.

The projections 117a1 and 117a2 stick out from the flexure 115a in the positive y direction. The direction in which each of the projections 117a1 and 117a2 sticks out (i.e., the positive y direction) intersects (orthogonally in the example shown in FIGS. 2 and 3) the longitudinal direction of the flexure 115a (i.e., direction along the x axis). The point at which the projection 117a1 sticks out from the flexure 115a is located downstream from the arm portion 113a in the negative x direction, whereas the point at which the projection 117a2 sticks out from the flexure 115a is located downstream from the arm portion 113a in the positive x direction. The projections 117a1 and 117a2 include neck portions 117a11 and 117a21, respectively, and head portions 117a12 and 117a22, respectively. One of opposite ends of each of the neck portions 117a 11 and 117a21 is connected to the flexure 115a. The other of the opposite ends of the neck portion 117a11 is connected to the head portion 117a12, and the other of the opposite ends of the neck portion 117a21 is connected to the head portion 117a22. The neck portions 117a11 and 117a21 are smaller in width than the head portions 117a12 and 117a22, respectively. This arrangement makes the projections 117a1 and 117a2 (especially, head portions 117a12 and 117a22) even less likely to deform even when the flexure 115a deforms.

The projections 117a3 and 117a4 stick out from the flexure 115a in the negative y direction. The direction in which each of the projections 117a3 and 117a4 sticks out (i.e., the negative y direction) intersects (orthogonally in the example shown in FIGS. 2 and 3) the longitudinal direction of the flexure 115a (i.e., direction along the x axis). The point at which the projection 117a3 sticks out from the flexure 115a is located downstream from the arm portion 113a in the negative x direction, whereas the point at which the projection 117a4 sticks out from the flexure 115a is located downstream from the arm portion 113a in the positive x direction. The projections 117a3 and 117a4 include neck portions 117a31 and 117a41, respectively, and head portions 117a32 and 117a42, respectively. One of opposite ends of each of the neck portions 117a31 and 117a41 is connected to the flexure 115a. The other of the opposite ends of the neck portion 117a31 is connected to the head portion 117a32, and the other of the opposite ends of the neck portion 117a41 is connected to the head portion 117a42. The neck portions 117a31 and 117a41 are smaller in width than the head portions 117a32 and 117a42, respectively. This arrangement makes the projections 117a3 and 117a4 (especially, head portions 117a32 and 117a42) even less likely to deform even when the flexure 115a deforms.

The flexure 115a has a strain gauge attached thereto in some cases. In such cases, one or more of the electrodes connected to the strain gauge can be attached on any of the projections 117a1 to 117a4. Furthermore, in these cases, a resistive element connected to the strain gauge can be attached on any of the projections 117a1 to 117a4. As such, an arrangement in which the flexure 115a has the projections 117a1 to 117a4 provides similar effects to those achieved by the arrangement in which the arm portion 113a has the projections 116a1 and 116a2.

Note that, although the present embodiment employs an arrangement in which deformable portions provided with projections are both the arm portions 113a to 113c and the flexures 115a to 115c, the present invention is not limited as such. For example, an arrangement in which deformable portions provided with projections are either of the arm portions 113a to 113c or the flexures 115a to 115c may be employed. Specifically, the following arrangement may be employed: deformable portions provided with projections are only the arm portions 113a to 113c; or deformable portions provided with projections are only the flexures 115a to 115c. Furthermore, the flexures 115a to 115c are not essential. In a case where there are no flexures 115a to 115c, deformable portions provided with projections are only the arm portions 113a to 113c.

[Stress Distribution in Strain Element]

The following description discusses a stress distribution in a strain element resulting when an external force is exerted on a core portion, with reference to FIGS. 6 to 27. The results shown below were obtained by 3D CAD simulation of a strain element of a force-torque sensor whose frame portion has an outer diameter of 55 mm when seen in plan view (φ55 force-torque sensor).

Figure 6:
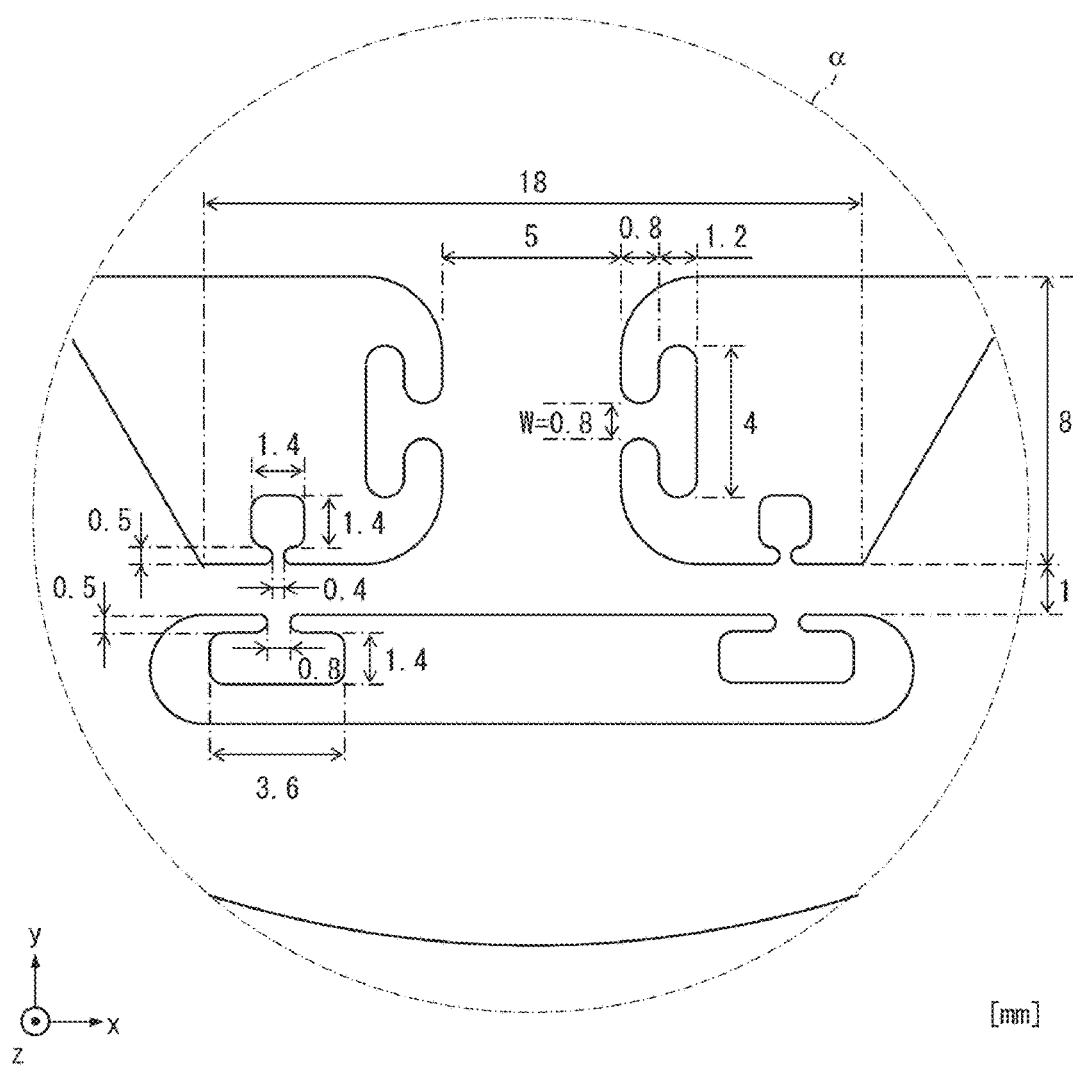
FIG. 6 is a plan view showing dimensions of each portion of a strain element of a force-torque sensor in accordance with an Example of the present invention.

FIG. 6 is a plan view showing dimensions of each portion of a strain element used as an Example. A Comparative Example used here is different from the strain element of the Example in that the Comparative Example has no projections.

Figure 7:
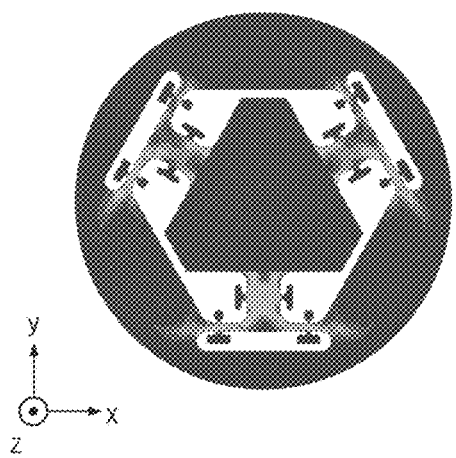
FIG. 7 shows a stress distribution in the strain element of FIG. 6 resulting when an external force in the positive x direction is exerted on a core portion.
Figure 8:
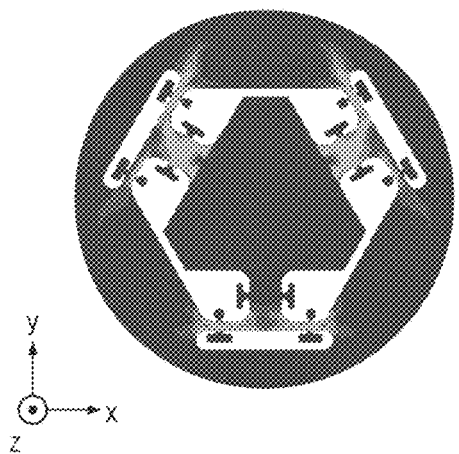
FIG. 8 shows a stress distribution in the strain element of FIG. 6 resulting when an external force in the positive y direction is exerted on the core portion.
Figure 9:
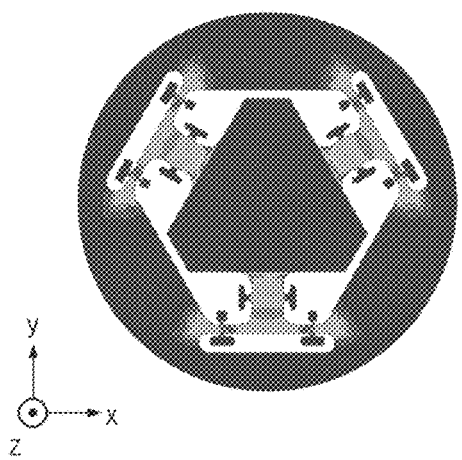
FIG. 9 shows a stress distribution in the strain element of FIG. 6 resulting when an external force in the positive z direction is exerted on the core portion.
Figure 10:
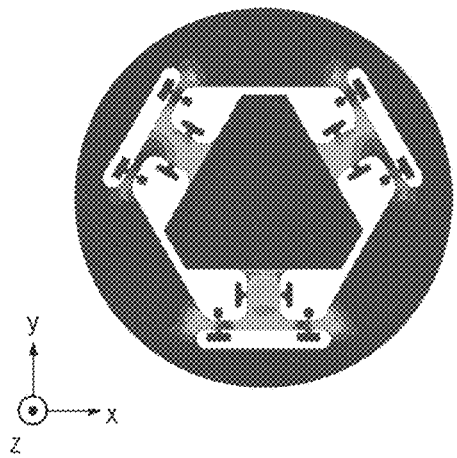
FIG. 10 shows a stress distribution in the strain element of FIG. 6 resulting when a moment about the x axis is exerted on the core portion.
Figure 11:
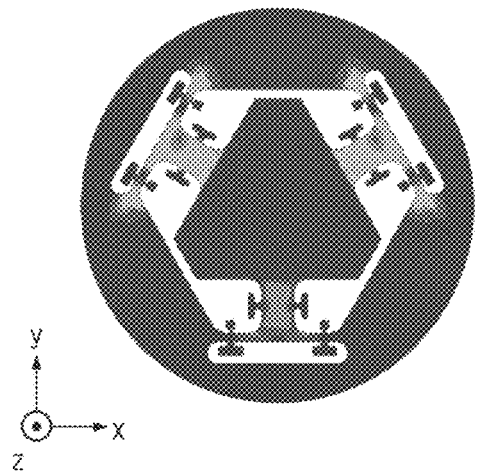
FIG. 11 shows a stress distribution in the strain element of FIG. 6 resulting when a moment about the y axis is exerted on the core portion.
Figure 12:
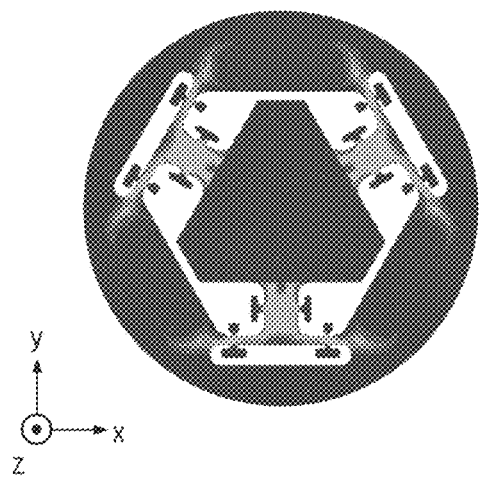
FIG. 12 shows a stress distribution in the strain element of FIG. 6 resulting when a moment about the z axis is exerted on the core portion.

FIGS. 7 to 12 each show a stress distribution in the strain element in accordance with the Example. FIG. 7 shows a stress distribution in the strain element in accordance with the Example resulting when external force Fx+, in the positive x direction, is exerted on the core portion. FIG. 8 shows a stress distribution in the strain element in accordance with the Example resulting when external force Fy+, in the positive y direction, is exerted on the core portion. FIG. 9 shows a stress distribution in the strain element in accordance with the Example resulting when external force Fz+, in the positive z direction, is exerted on the core portion. FIG. 10 shows a stress distribution in the strain element in accordance with the Example resulting when moment Mx+, about the x axis, is exerted on the core portion. FIG. 11 shows a stress distribution in the strain element in accordance with the Example resulting when moment My+, about the y axis, is exerted on the core portion. FIG. 12 shows a stress distribution in the strain element in accordance with the Example resulting when moment Mz+, about the z axis, is exerted on the core portion.

Figure 13:
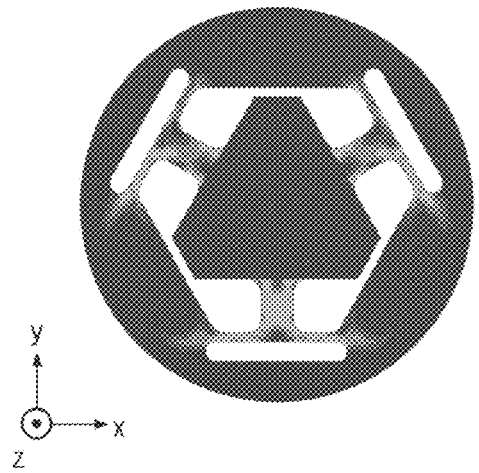
FIG. 13 shows a stress distribution in a strain element in accordance with a Comparative Example resulting when an external force in the positive x direction is exerted on a core portion.
Figure 14:
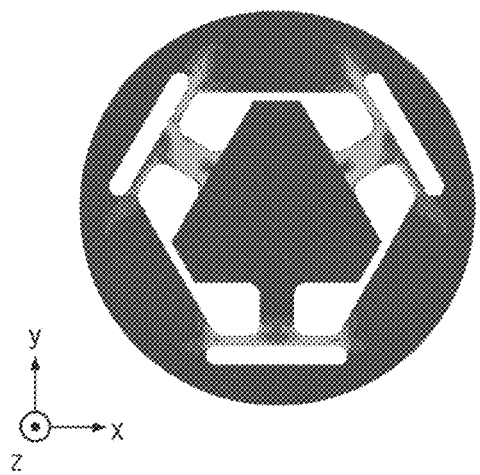
FIG. 14 shows a stress distribution in the strain element in accordance with the Comparative Example resulting when an external force in the positive y direction is exerted on the core portion.
Figure 15:
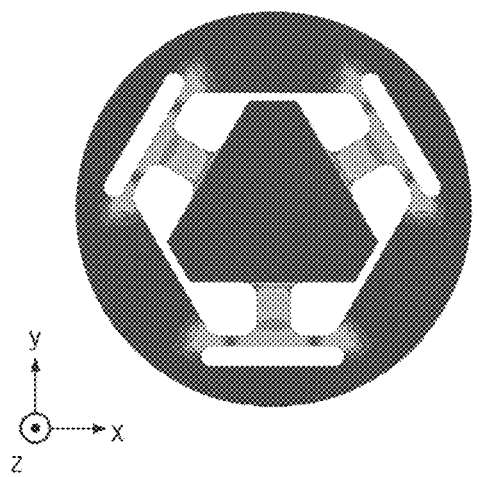
FIG. 15 shows a stress distribution in the strain element in accordance with the Comparative Example resulting when an external force in the positive z direction is exerted on the core portion.
Figure 16:
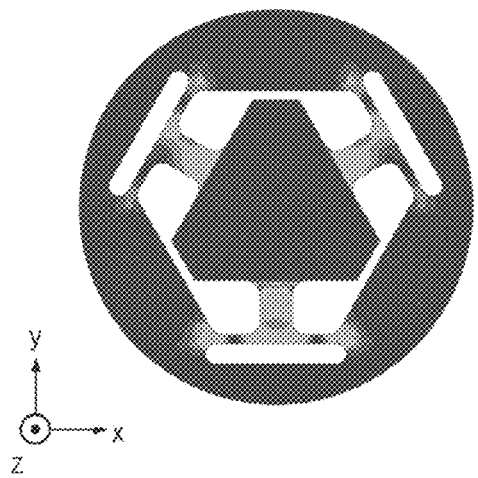
FIG. 16 shows a stress distribution in the strain element in accordance with the Comparative Example resulting when a moment about the x axis is exerted on the core portion.
Figure 17:
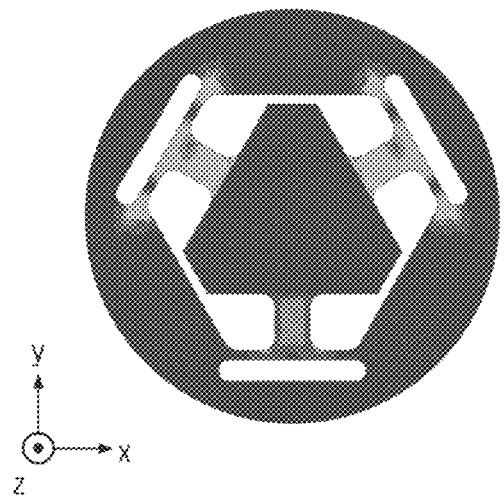
FIG. 17 shows a stress distribution in the strain element in accordance with the Comparative Example resulting when a moment about the y axis is exerted on the core portion.
Figure 18:
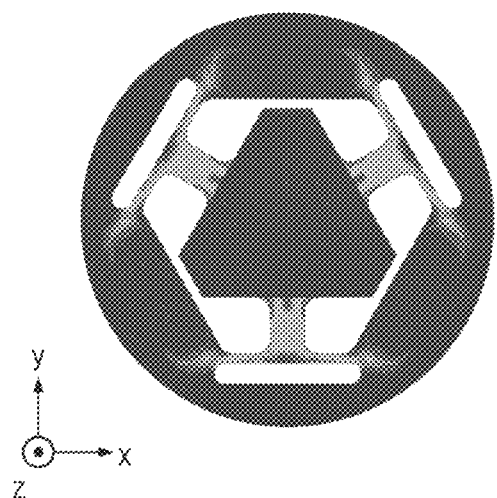
FIG. 18 shows a stress distribution in the strain element in accordance with the Comparative Example resulting when a moment about the z axis is exerted on the core portion.

FIGS. 13 to 18 each show a stress distribution in the strain element in accordance with the Comparative Example. FIG. 13 shows a stress distribution in the strain element in accordance with the Comparative Example resulting when external force Fx+, in the positive x direction, is exerted on the core portion. FIG. 14 shows a stress distribution in the strain element in accordance with the Comparative Example resulting when external force Fy+, in the positive y direction, is exerted on the core portion. FIG. 15 shows a stress distribution in the strain element in accordance with the Comparative Example resulting when external force Fz+, in the positive z direction, is exerted on the core portion. FIG. 16 shows a stress distribution in the strain element in accordance with the Comparative Example resulting when moment Mx+, about the x axis, is exerted on the core portion. FIG. 17 shows a stress distribution in the strain element in accordance with the Comparative Example resulting when moment My+, about the y axis, is exerted on the core portion. FIG. 18 shows a stress distribution in the strain element in accordance with the Comparative Example resulting when moment Mz+, about the z axis, is exerted on the core portion.

FIGS. 7 to 12 demonstrate the following. Specifically, no or sufficiently small stress occurs in each projection. This indicates that, even when an external force is exerted on the core portion, no or sufficiently small deformation occurs in each projection. In was confirmed from the above results that a projection is suitable as an area for attachment of an element that changes its properties upon deformation (such an element is, for example, a resistive element).

A comparison between FIGS. 7 to 12 and FIGS. 13 to 18 demonstrates the following. Specifically, the presence of projections has no or a sufficiently small effect on the stress that occurs in arm portions and flexures. It was confirmed from this that the presence of projections causes no or sufficiently small loss of accuracy of the force-torque sensor.

Next, a study was conducted on how the stress distribution in an arm portion, resulting when external force Fx+ (in the positive x direction) is exerted on the core portion, depends on a width W (see FIG. 6) of a portion, which is adjacent to the arm portion, of a projection. The results are shown in FIGS. 19 to 27. Note that, in the present embodiment, in a case where the projection includes a constricted portion which connects to the arm portion, the width W is the width of the narrowest portion of the constricted portion.

Figure 19:
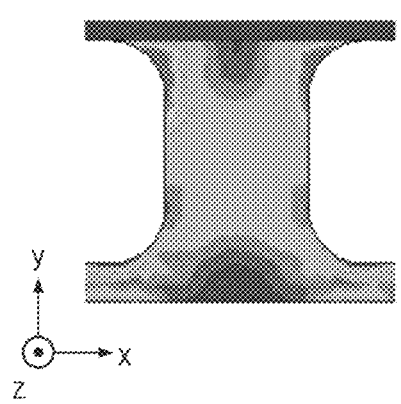
FIG. 19 shows a stress distribution in an arm portion of the strain element in accordance with the Comparative Example.
Figure 20:
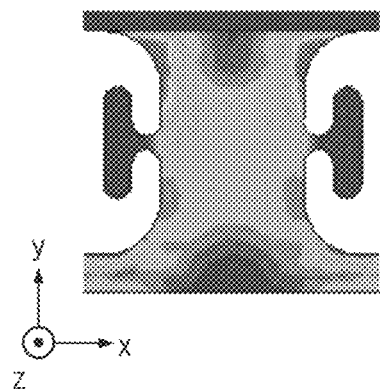
FIG. 20 shows a stress distribution in an arm portion of the strain element of FIG. 6 in which a width W is 0.5 mm.
Figure 21:
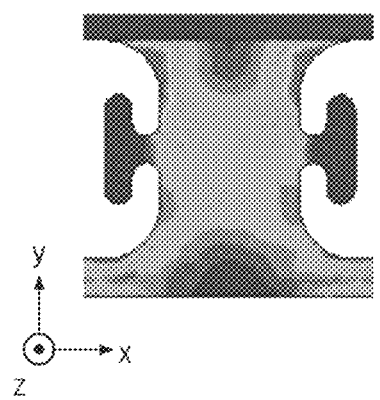
FIG. 21 shows a stress distribution in an arm portion of the strain element of FIG. 6 in which the width W is 1.0 mm.
Figure 22:
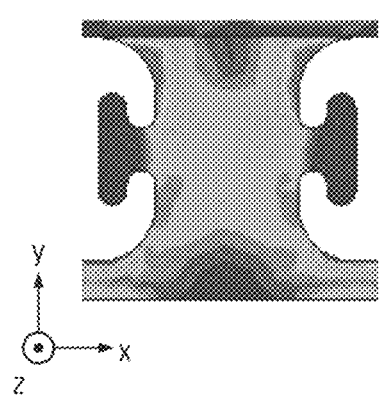
FIG. 22 shows a stress distribution in an arm portion of the strain element of FIG. 6 in which the width W is 1.5 mm.
Figure 23:
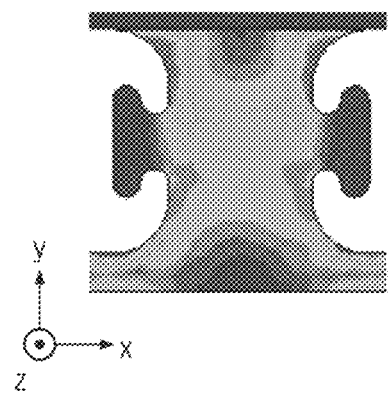
FIG. 23 shows a stress distribution in an arm portion of the strain element of FIG. 6 in which the width W is 2.0 mm.
Figure 24:
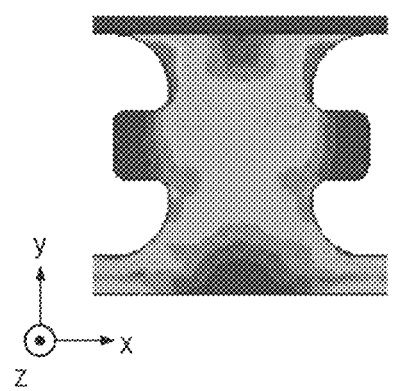
FIG. 24 shows a stress distribution in an arm portion of the strain element of FIG. 6 in which the width W is 2.5 mm.
Figure 25:
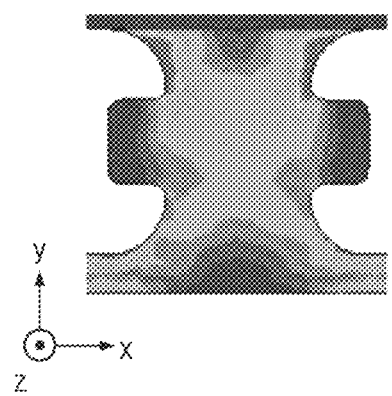
FIG. 25 shows a stress distribution in an arm portion of the strain element of FIG. 6 in which the width W is 3.0 mm
Figure 26:
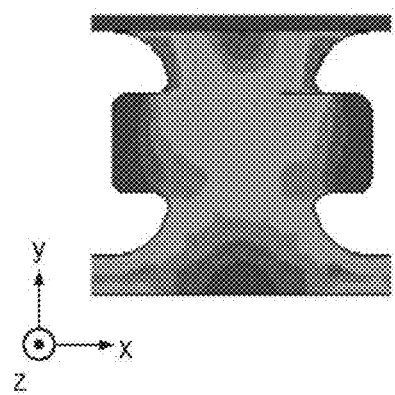
FIG. 26 shows a stress distribution in an arm portion of the strain element of FIG. 6 in which the width W is 3.5 mm.
Figure 27:
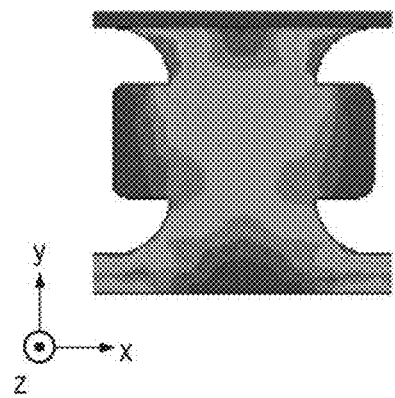
FIG. 27 shows a stress distribution in an arm portion of the strain element of FIG. 6 in which the width W is 4.0 mm.

FIG. 19 shows a stress distribution in an arm portion of the strain element in accordance with the Comparative Example. FIG. 20 shows a stress distribution in an arm portion of the strain element in accordance with the Example in which the width W is 0.5 mm. FIG. 21 shows a stress distribution in an arm portion of the strain element in accordance with the Example in which the width W is 1.0 mm. FIG. 22 shows a stress distribution in an arm portion of the strain element in accordance with the Example in which the width W is 1.5 mm. FIG. 23 shows a stress distribution in an arm portion of the strain element in accordance with the Example in which the width W is 2.0 mm. FIG. 24 shows a stress distribution in an arm portion of the strain element in accordance with the Example in which the width W is 2.5 mm. FIG. 25 shows a stress distribution in an arm portion of the strain element in accordance with the Example in which the width W is 3.0 mm. FIG. 26 shows a stress distribution in an arm portion of the strain element in accordance with the Example in which the width W is 3.5 mm. FIG. 27 shows a stress distribution in an arm portion of the strain element in accordance with the Example in which the width W is 4.0 mm. Note that, for convenience of simulation, projections with a constant width (not separated into a narrow neck portion and a wide head portion) were employed in cases where the width W in the strain element was 2.5 mm or greater.

FIGS. 19 to 27 demonstrate the following. First, in cases where the width W is equal to or less than 4.0 mm, in order words, in cases where the width W is not more than half the length L (8 mm) of the arm portion, the projections have areas where no stress occurs. Therefore, in a case where a projection is used as an area for attachment of an element that changes its properties upon deformation (such an element is, for example, a resistive element), the width W is preferably not more than half the length L of the arm portion. Second, in cases where the width W is equal to or less than 1.0 mm, in order words, in cases where the width W is not more than one-eighth of the length L (8 mm) of the arm portion, the stress that occurs in the arm portion is substantially the same as that in a case where there are not projections. Therefore, in a case where the force-torque sensor 1 is required to have very high accuracy, the width W is preferably not more than one-eighth of the length L of the arm portion.

[Example Configuration of Resistive Element]

The following description will discuss example configurations of each of the resistive elements belonging to the resistive element group 14, with reference to FIGS. 28 to 39.

Figure 28:
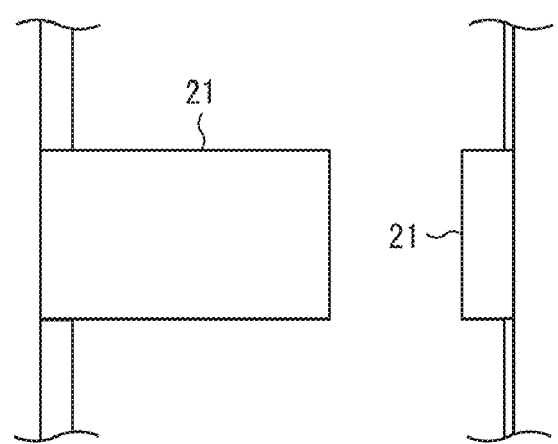
FIG. 28 shows a plan view and a side view of a first example configuration of a resistive element.
Figure 29:
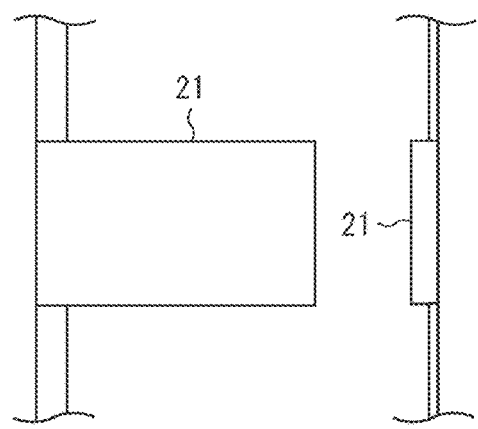
FIG. 29 shows a plan view and a side view of the first example configuration of the resistive element.

FIGS. 28 and 29 each show a plan view and a side view of a first example configuration of a resistive element.

The resistive element in accordance with the first example configuration is constituted by a thin-film resistor 21 which is quadrangular (rectangular in FIGS. 28 and 29) when seen in plan view. The resistance of the resistive element is adjusted by shaving the top face of the thin-film resistor 21 and thereby reducing the thickness of the thin-film resistor 21. FIG. 28 shows the resistive element before the adjustment, and FIG. 29 shows the resistive element after the adjustment. The adjustment reduces the cross sectional area of the thin-film resistor 21, and therefore increases the resistance of the resistive element. Note that the extent to which the resistance is to be increased can be adjusted appropriately by changing the amount by which the thickness of the thin-film resistor 21 is reduced by shaving.

Figure 30:
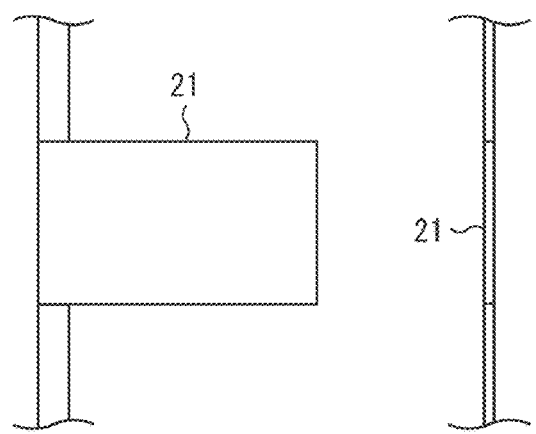
FIG. 30 shows a plan view and a side view of a second example configuration of a resistive element.
Figure 31:
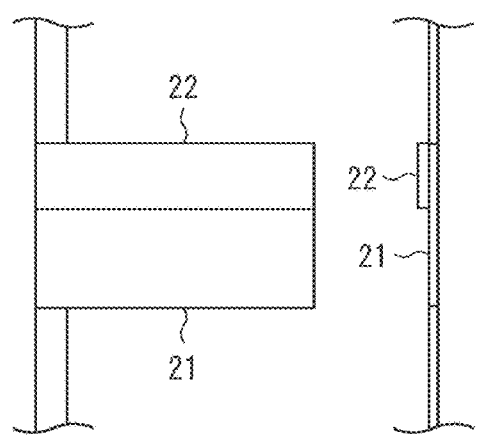
FIG. 31 shows a plan view and a side view of the second example configuration of the resistive element.

FIGS. 30 and 31 each show a plan view and a side view of a second example configuration of a resistive element.

The resistive element in accordance with the second example configuration is constituted by a thin-film resistor 21 which is quadrangular (rectangular in FIGS. 30 and 31) when seen in plan view, similarly to the resistive element in accordance with the first example configuration. The resistance of the resistive element is adjusted by forming a conductor layer 22 on the top face of the thin-film resistor 21. FIG. 30 shows the resistive element before the adjustment, and FIG. 31 shows the resistive element after the adjustment. The adjustment reduces the effective length of the thin-film resistor 21, and therefore reduces the resistance of the resistive element. Note that the extent to which the resistance is to be reduced can be adjusted appropriately by changing the length of the conductor layer 22.

Figure 32:
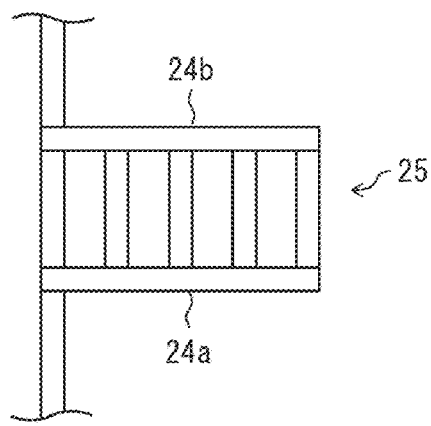
FIG. 32 is a plan view of a third example configuration of a resistive element before adjustment.
Figure 33:
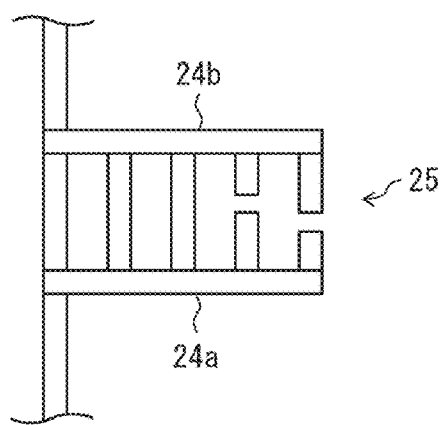
FIG. 33 is a plan view of the third example configuration of the resistive element after adjustment.

FIGS. 32 and 33 are each a plan view of a third example configuration of a resistive element.

The resistive element in accordance with the third example configuration is constituted by (i) a first narrow thin-film conductor 24a, (ii) a second narrow thin-film conductor 24b disposed parallel to the first narrow thin-film conductor 24a, and (iii) a plurality of narrow thin-film resistors 25 each of which has one of opposite ends connected to the first narrow thin-film conductor 24a and the other of the opposite ends connected to the second narrow thin-film conductor 24b. The resistance of the resistive element is adjusted by cutting at least one of the narrow thin-film resistors 25. FIG. 32 shows the resistive element before the adjustment, and FIG. 33 shows the resistive element after the adjustment. This adjustment reduces the number of narrow thin-film resistors 25 bridging the first narrow thin-film conductor 24a and the second narrow thin-film conductor 24b, and therefore increases the resistance of the resistive element. Note that the extent to which the resistance is to be increased can be adjusted appropriately by changing the number of narrow thin-film resistors 25 to be cut.

Figure 34:
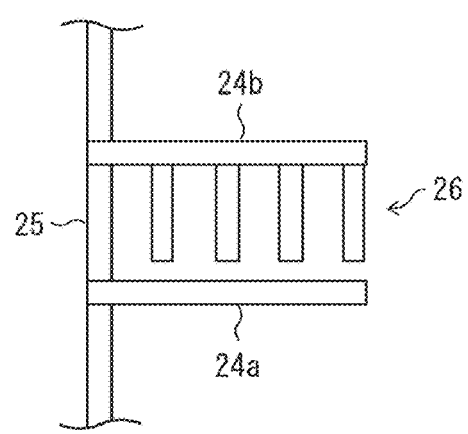
FIG. 34 is a plan view of a fourth example configuration of a resistive element before adjustment.
Figure 35:
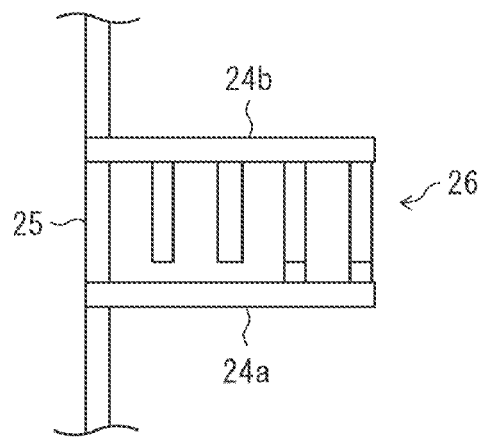
FIG. 35 is a plan view of the fourth example configuration of the resistive element after adjustment.

FIGS. 34 and 35 are each a plan view of a fourth example configuration of a resistive element.

The resistive element in accordance with the fourth example configuration is constituted by (i) a first narrow thin-film conductor 24a, (ii) a second narrow thin-film conductor 24b disposed parallel to the first narrow thin-film conductor 24a, (iii) a narrow thin-film resistor 25 which has one of opposite ends connected to the first narrow thin-film conductor 24a and the other of the opposite ends connected to the second narrow thin-film conductor 24b, and (iv) a plurality of narrow thin-film resistors 26 each of which has one of opposite ends open and the other of the opposite ends connected to the second narrow thin-film conductor 24b. The resistance of the resistive element is adjusted by connecting at least one of the narrow thin-film resistors 26 to the first narrow thin-film conductor 24a with solder or the like. FIG. 34 shows the resistive element before the adjustment, and FIG. 35 shows the resistive element after the adjustment. This adjustment increases the number of narrow thin-film resistors 26 bridging the first narrow thin-film conductor 24a and the second narrow thin-film conductor 24b, and therefore reduces the resistance of the resistive element. Note that the extent to which the resistance is to be reduced can be adjusted appropriately by changing the number of narrow thin-film resistors 26 to be connected to the first narrow thin-film conductor 24a.

Figure 36:
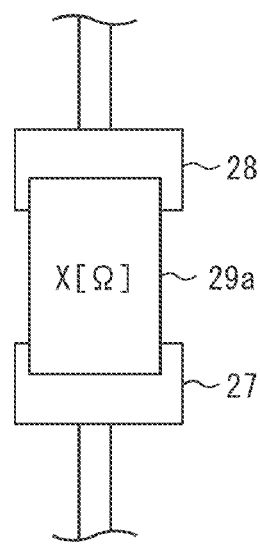
FIG. 36 is a plan view of a fifth example configuration of a resistive element before adjustment.
Figure 37:
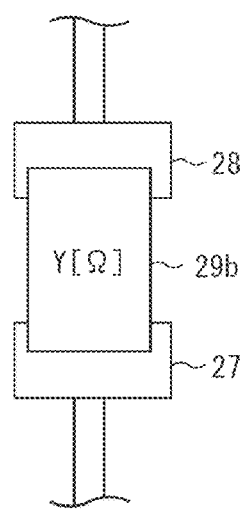
FIG. 37 is a plan view of the fifth example configuration of the resistive element after adjustment.

FIGS. 36 and 37 are each a plan view of a fifth example configuration of a resistive element.

The resistive element in accordance with the fifth example configuration is constituted by (i) a first electrode 27, (ii) a second electrode 28, and (iii) a chip resistor 29a having one of opposite ends connected to the first electrode 27 and the other of the opposite ends connected to the second electrode 28. The resistance of the resistive element is adjusted by (a) detaching the chip resistor 29a and (b) attaching another chip resistor 29b which is different in resistance from the chip resistor 29a (connecting one of opposite ends of the another chip resistor 29b to the first electrode 27, and connecting the other of the opposite ends of the another chip resistor 29b to the second electrode 28). FIG. 36 shows the resistive element before the adjustment, and FIG. 37 shows the resistive element after the adjustment. In a case where the resistance of the new chip resistor 29b is greater than the resistance of the old chip resistor 29a, the adjustment increases the resistance of the resistive element. On the contrary, in a case where the resistance of the new chip resistor 29b is smaller than the resistance of the old chip resistor 29a, the adjustment reduces the resistance of the resistive element.

Figure 38:
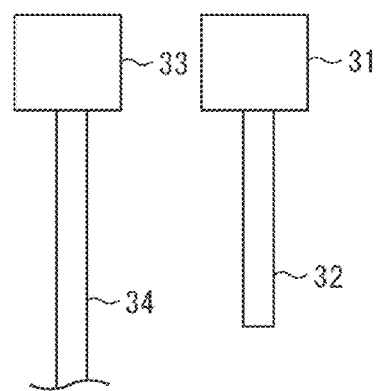
FIG. 38 is a plan view of a sixth example configuration of a resistive element before adjustment.
Figure 39:
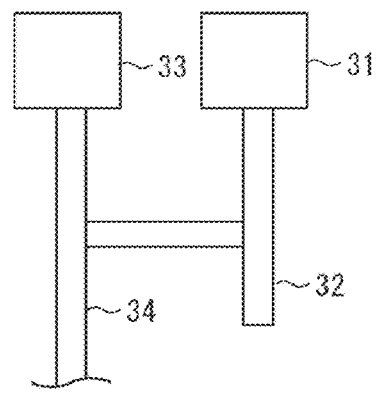
FIG. 39 is a plan view of the sixth example configuration of the resistive element after adjustment.

FIGS. 38 and 39 are each a plan view of a sixth example configuration of a resistive element.

The resistive element in accordance with the sixth example configuration includes (i) an electrode 31 and (ii) a narrow thin-film resistor 32 having one of opposite ends connected to the electrode 31. The electrode 31 is disposed next to an electrode 33 to which an element is connected. The narrow thin-film resistor 32 is disposed next to a narrow thin-film conductor 34 having one of opposite ends connected to the electrode 33. The resistance of the resistive element can be adjusted by (a) short-circuiting the narrow thin-film resistor 32 and the narrow thin-film conductor 34 with solder or the like, (b) detaching the element from the electrode 33, and (c) attaching the element to the electrode 31. FIG. 38 shows the resistive element before the adjustment, and FIG. 39 shows the resistive element after the adjustment. As a result of the adjustment, the narrow thin-film resistor 32 resides between the narrow thin-film conductor 34 and the element. The adjustment thus increases the resistance of the resistive element. Note that the extent to which the resistance is to be increased can be adjusted appropriately by changing the position of the short circuit between the narrow thin-film resistor 32 and the narrow thin-film conductor 34.

Aspects of the present invention can also be expressed as follows.

A force sensor in accordance with Aspect 1 of the present invention includes: a strain element including a deformable portion that is deformable under an external force; and a strain gauge attached to the at least deformable portion, and employs the following arrangement. Specifically, the strain element includes a projection that sticks out from the deformable portion in a direction intersecting a longitudinal direction of the deformable portion.

According to the above arrangement, the projection is adjacent to the deformable portion, and is less likely to deform even when the deformable portion deforms. Therefore, according to the above arrangement, an electrode, resistive element, and/or the like connected to the strain gauge can be suitably attached on the projection.

A force sensor in accordance with Aspect 2 of the present invention employs the following arrangement in addition to the arrangement of the force sensor in accordance with Aspect 1. Specifically, the strain element includes (i) a core portion, (ii) a frame portion that extends around the core portion and that includes a flexure, and (iii) an arm portion that connects the core portion and the flexure, and the deformable portion is the arm portion and/or the flexure.

According to the above arrangement, the projection is adjacent to the arm portion or the flexure, and is less likely to deform even when the arm portion or the flexure deforms. Therefore, according to the above arrangement, an electrode, resistive element, and/or the like connected to the strain gauge can be suitably attached on the projection.

A force sensor in accordance with Aspect 3 of the present invention employs the following arrangement in addition to the arrangement of the force sensor in accordance with Aspect 1. Specifically, the strain element includes (i) a core portion, (ii) a frame portion that extends around the core portion, and (iii) an arm portion that connects the core portion and the frame portion, and the deformable portion is the arm portion.

According to the above arrangement, the projection is adjacent to the arm portion, and is less likely to deform even when the arm portion deforms. Therefore, according to the above arrangement, an electrode, resistive element, and/or the like connected to the strain gauge can be suitably attached on the projection.

A force sensor in accordance with Aspect 4 of the present invention employs the following arrangement in addition to the arrangement of the force sensor in accordance with any of Aspects 1 to 3. Specifically, an electrode connected to the strain gauge and/or a resistive element connected to the strain gauge are/is attached on the projection.

According to the above arrangement, in a case where the electrode is attached on the projection, it is possible to carry out wiring operations easily. Furthermore, according to the above arrangement, in a case where the resistive element is attached on the projection, it is possible to prevent or reduce a loss of accuracy of the force sensor that would be caused by changes in properties of the resistive element.

A force sensor in accordance with Aspect 5 of the present invention employs the following arrangement in addition to the arrangement of the force sensor in accordance with any of Aspects 1 to 4. Specifically, the projection includes a neck portion and a head portion that is greater in width than the neck portion, and the neck portion has opposite ends one of which is connected to the deformable portion and the other of which is connected to the head portion.

According to the above arrangement, it is possible to further reduce the deformation of the projection that could occur when the deformable portion deforms.

A force sensor in accordance with Aspect 6 of the present invention employs the following arrangement in addition to the arrangement of the force sensor in accordance with any of Aspects 1 to 5. Specifically, a width of a portion, which is adjacent to the deformable portion, of the projection is not more than half a length of the deformable portion.

According to the above arrangement, it is possible to further reduce the deformation of the projection that could occur when the deformable portion deforms.

A strain element in accordance with Aspect 7 of the present invention includes a deformable portion that is deformable under an external force, and employs the following arrangement similarly to the force sensor in accordance with Aspect 1. Specifically, the strain element includes a projection that sticks out from the deformable portion in a direction intersecting a longitudinal direction of the deformable portion.

According to the above arrangement, the projection is adjacent to the deformable portion, and is less likely to deform even when the deformable portion deforms. Therefore, according to the above arrangement, an electrode, an element (for example, a resistive element), and/or the like connected to another element attached on the deformable portion (such an element is, for example, a strain gage) can be suitably attached on the projection.

[Remarks]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 force-torque sensor
11 strain element
111 core portion (force receiver)
112 frame portion (fixing portion)
113*a* to 113*c* arm portion
114*a* to 114*c* through-hole
115*a* to 115*c* flexure
12 strain gauge group
13 electrode group
14 resistive element group
15 bridge circuit group

The invention claimed is:

1. A force sensor comprising:
a core portion;
a frame portion that extends around the core portion and that includes a flexure;
an arm portion that connects the core portion and the flexure;
a projection that sticks out from the arm portion in a direction intersecting a longitudinal direction of the arm portion, or from the flexure in a direction intersecting a longitudinal direction of the flexure; and
a strain gauge attached to the arm portion or the flexure, wherein
the arm portion and the flexure are deformed by an external force exerted on the core portion or the frame portion,
the projection includes a neck portion connected to the arm portion or the flexure at one end of the neck portion, and a head portion connected to the other end of the neck portion, and
a width of the neck portion is less than or equal to a width of the head portion.

2. The force sensor according to claim 1, wherein the head portion is greater in width than the neck portion.

3. The force sensor according to claim 1, wherein a width of a portion, which is adjacent to the arm portion or the flexure, of the projection is not more than half a length of the arm portion or the flexure.

4. The force sensor according to claim 1, wherein an electrode connected to the strain gauge and/or a resistive element connected to the strain gauge are/is attached to the projection.

5. A strain element comprising:
a core portion;
a frame portion that extends around the core portion and that includes a flexure;
an arm portion that connects the core portion and the flexure; and
a projection that sticks out from the arm portion in a direction intersecting a longitudinal direction of the arm portion, or from the flexure in a direction intersecting a longitudinal direction of the flexure, wherein
the arm portion and the flexure are deformed by an external force exerted on the core portion or the frame portion,
the projection includes a neck portion connected to the arm portion or the flexure at one end of the neck portion, and a head portion connected to the other end of the neck portion, and
a width of the neck portion is less than or equal to a width of the head portion.

* * * * *